United States Patent [19]

Mufford et al.

[11] Patent Number: 5,771,476
[45] Date of Patent: Jun. 23, 1998

[54] POWER CONTROL SYSTEM FOR A FUEL CELL POWERED VEHICLE

[75] Inventors: W. Edward Mufford, Langley; Douglas G. Strasky, Vancouver, both of Canada

[73] Assignee: DBB Fuel Cell Engines GmbH, Nabern, Germany

[21] Appl. No.: 581,312

[22] Filed: Dec. 29, 1995

[51] Int. Cl.$^6$ .................................................. H01M 8/10
[52] U.S. Cl. ......................... 701/22; 180/65.1; 180/65.3; 429/19; 429/21
[58] Field of Search ........................ 701/1, 22; 180/65.1, 180/65.2, 65.3, 65.4, 65.5; 307/10.1; 429/9, 19, 21, 30

[56] References Cited

U.S. PATENT DOCUMENTS

| | | | |
|---|---|---|---|
| 4,489,242 | 12/1984 | Worst ...................................... | 307/10.1 |
| 4,923,768 | 5/1990 | Kaneko et al. ........................... | 429/19 |
| 5,366,821 | 11/1994 | Merritt et al. ............................ | 429/21 |
| 5,434,015 | 7/1995 | Yamada et al. .......................... | 429/9 |
| 5,434,016 | 7/1995 | Benz et al. ................................ | 429/19 |
| 5,482,790 | 1/1996 | Yamada et al. .......................... | 429/9 |
| 5,532,573 | 7/1996 | Brown et al. ............................ | 429/30 |
| 5,662,184 | 9/1997 | Riemer et al. ......................... | 180/65.1 |
| 5,678,647 | 10/1997 | Wolfe et al. ........................... | 180/65.3 |

OTHER PUBLICATIONS

"Ballard PEM Fuel Cell Powered ZEV Bus", SAE Technical Paper Series, No. 931817, pp. 113–20, Howard et al., Aug. 1993.

"Ballard Zero Emission Fuel Cell Bus Engine", the 12th International Electric Vehicle Symposium (EVS–12), vol. 1, Sessions 1A–2D, Poster Sessions, Howard, Dec. 1994.

*Primary Examiner*—Gary Chin
*Attorney, Agent, or Firm*—McAndrews, Held & Malloy, Ltd.

[57] ABSTRACT

A power control system for controlling the supply of a reactant gas, such as air, for reaction within a fuel cell stack used to power, for example, a motor vehicle is set forth. The disclosed system may be used to reduce or eliminate compressor revving and instabilities common to prior systems in which fuel cell power output is dependent upon a flow of a reactant gas through a fuel cell stack, the flow of reactant gas being determined by the compressor speed.

4 Claims, 9 Drawing Sheets

(Prior System)

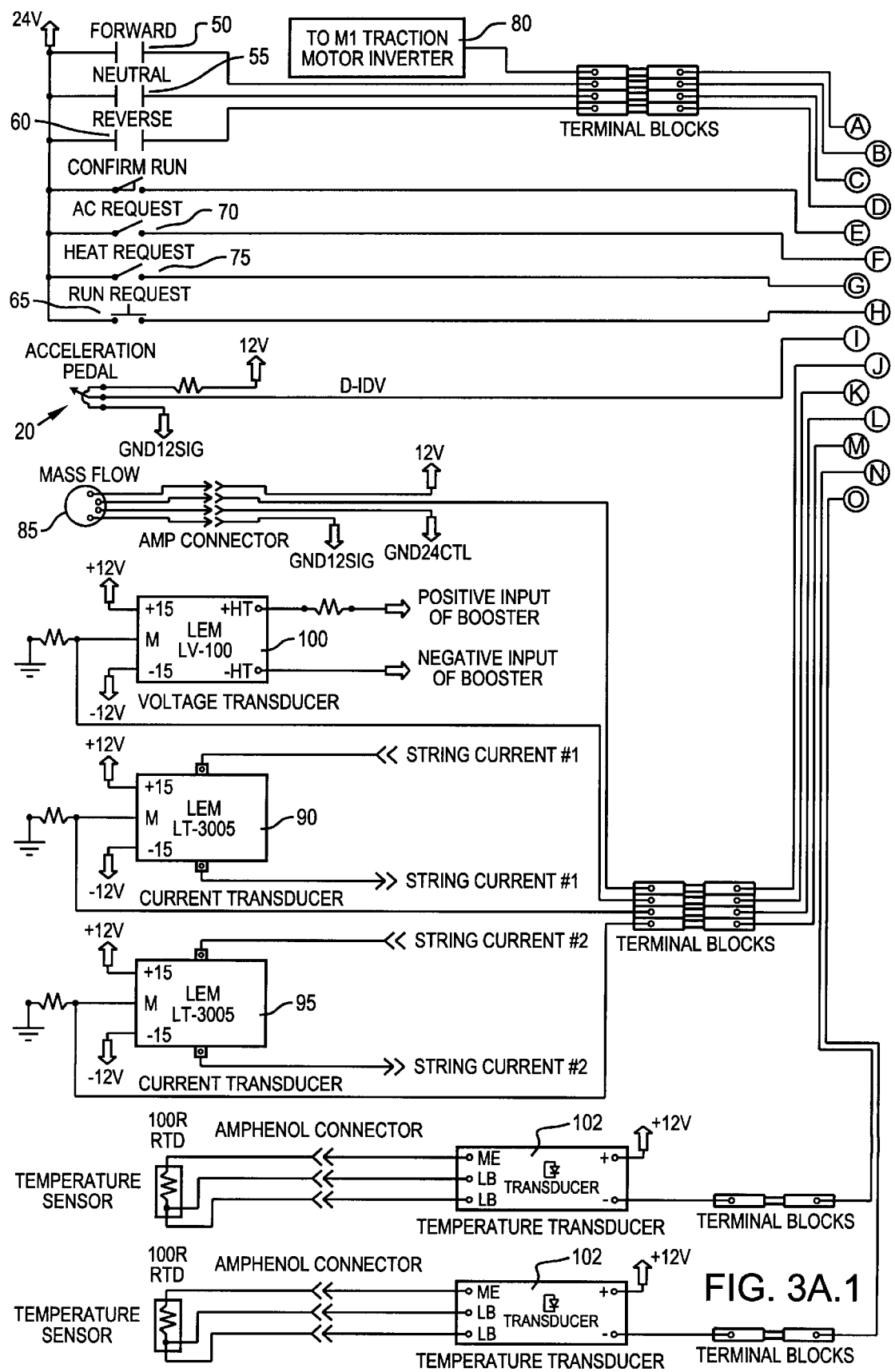
FIG. 3A.1

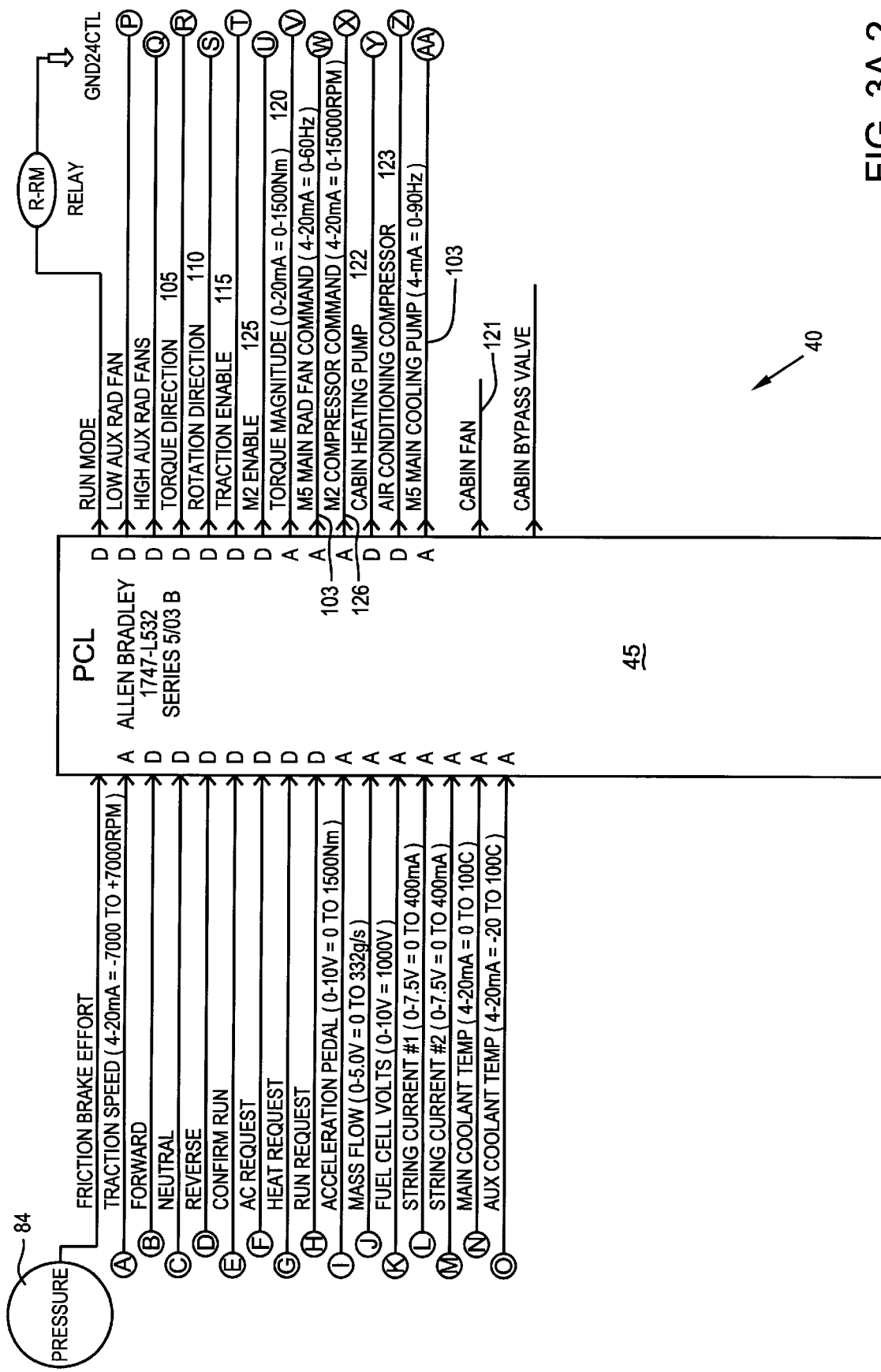
FIG. 3A.2

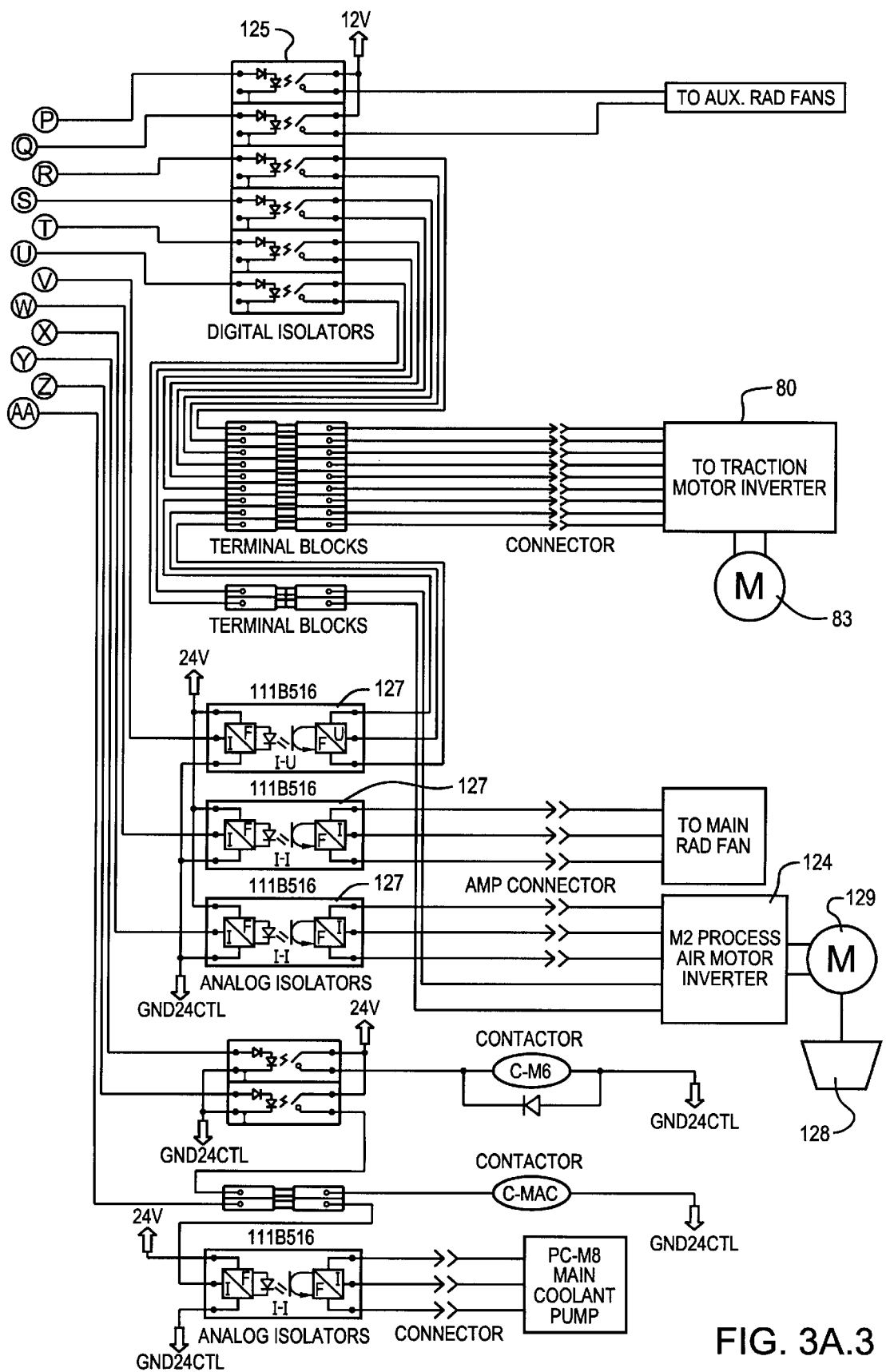
FIG. 3A.3

POWER CONTROL SYSTEM FOR A FUEL CELL POWERED VEHICLE

FIELD OF THE INVENTION

The present invention relates to a power control system for a motor vehicle. More particularly, the present invention relates to a power control system for a motor vehicle that receives power from a fuel cell system wherein the power delivered by the fuel cell system is dependent on reactant flow through a fuel cell stack.

BACKGROUND OF THE INVENTION

Internal combustion engines have contributed greatly to the advancement of society. Vehicles powered by these engines have shortened the travel times between us by making long distance road travel routine. Such engines, however, have also greatly contributed to the pollution of our environment. The combustion of petroleum products in these engines results in unwanted byproducts such as carbon monoxide, carbon dioxide, sulfur dioxide, nitrogen dioxide, etc., that are dumped into our atmosphere.

Vehicles powered by alternative energy sources are under development. One such alternative energy source is the fuel cell. Fuel cells, for example, generate electric energy through reaction of hydrogen and oxygen. The electric energy that is generated is used to drive an electric motor that, in turn, drives the wheels of the vehicle. The product of the chemical reaction in a fuel cell utilizing hydrogen and oxygen is water, a product which is essential to our environment and which is easily disposed of.

FIG. 1 illustrates one embodiment of a hydrogen and oxygen supply for a fuel cell stack that, for example, is used to power an electric vehicle. The oxygen for the fuel cell reaction can typically be obtained from the ambient air while the hydrogen is obtained, for example, from a hydrogen fuel tank, a hydrogen storage device, or in a reformate stream from a catalytic reformer. The hydrogen and air for the fuel cell are handled by respective air and hydrogen supply systems that are each under the control of, for example, a programmable logic controller (PLC).

The power available from the fuel cell stack must be sufficient to meet the power required to run the various component systems of the vehicle (e.g., traction motor, air conditioning, lights, pump motors, etc.). The fuel cell reaction, and, thus, the available output power from the fuel cell, may be controlled by regulating the air flow from the air supply system through the fuel cell stack. In the illustrated exemplary system, this air flow is under the control of a compressor within the air supply system. The compressor, in turn, is under the control of the PLC and appertaining circuitry used to control the speed of the compressor based on various sensed input signals. These sensed input signals include the measured air mass flow rate of the air supplied to the fuel cell, as measured by sensor 10 of FIG. 1, the current output from the fuel cell stack, as measured by current sensor 15, the voltage output of the fuel cell stack, as measured by the PLC across output leads 20, and accelerator pedal movement and position, as measured by system 25.

One manner in which the PLC can use the foregoing input signals to control the illustrated system is set forth in FIG. 2. As would be understood by those skilled in the art, the PLC performs the illustrated steps and functions under a combination of hardware and software control.

The PLC accepts the sensed fuel cell current value and calculates the stoichiometric air flow that is needed to provide the power required by the loads on the fuel cell stack based on the sensed current value. Additionally, the PLC determines whether changes to the air mass flow are needed as a result of changes in the accelerator pedal position and to what degree such changes are required. Still further, the PLC determines whether an additional increase in air flow is required as a result of a low voltage condition of the fuel cell stack based on the measured fuel cell stack voltage. The results of these three calculations are summed and are compared to the measured air mass flow to generate an error signal. This error signal is processed, for example, using a PID (proportional-integral-derivative) control, such a control being understood and readily implemented by those skilled in the design of control systems. PID processing results in an output signal value that, for example, may be converted to an analog signal by an digital-to-analog converter that is supplied to control a mechanism, for example, the speed of the air compressor, to provide the required air mass flow to the fuel cell stack.

In the foregoing system, any increase in air compressor speed also results in an increase in the detected fuel cell current. This results in a positive feedback loop to the PLC's fuel cell current input. The positive feedback, in turn, causes a change in the output signal that is supplied to the air compressor and causes, for example, a revving of the air compressor. Such revving and instabilities may be noticed by and become annoying to the vehicle driver.

Another system that describes the control of air flow through a fuel cell stack in response to fuel cell current is set forth in U.S. Pat. No. 5,434,016 issued Jul. 18, 1995, entitled "Process And Apparatus For Supplying Air To A Fuel Cell System", which is incorporated by reference herein in its entirety. This system likewise may be rendered unstable by the influence of the compressor current on the fuel cell current input to the PLC.

SUMMARY OF THE INVENTION

A power control system for controlling the supply of a reactant gas, such as air, for reaction within a fuel cell stack used to power, for example, a motor vehicle is set forth. The disclosed system may be used to reduce or eliminate compressor revving and instabilities common to prior systems in which fuel cell power output is dependent upon a flow of a reactant gas through a fuel cell stack, the flow of reactant gas being determined by the compressor speed.

In accordance with the present system, the system measures one or more electrical power components (i.e., voltage and/or current) of the actual power being drawn from the fuel cell stack and provides a calculated value for the air flow required to meet the detected power demands. This calculated value is compared to a measurement of the actual reactant gas mass flow to generate a correction signal. To reduce or eliminate the compressor speed instability that would otherwise occur if the resulting correction signal were used to control the speed of the compressor, a feed forward system is also provided. The feed forward system measures power demanded from the fuel cell based on status signals, indicating present and anticipated power consumption, received from a plurality of power consuming systems of the vehicle, and generates a calculated reactant gas mass flow signal based on the demanded power. This calculated reactant gas mass flow is combined with the correction signal to generate a control signal that, for example, is converted to an analog signal used to control the speed of the compressor.

DESCRIPTION OF THE PREFERRED EMBODIMENT

Figure 1:
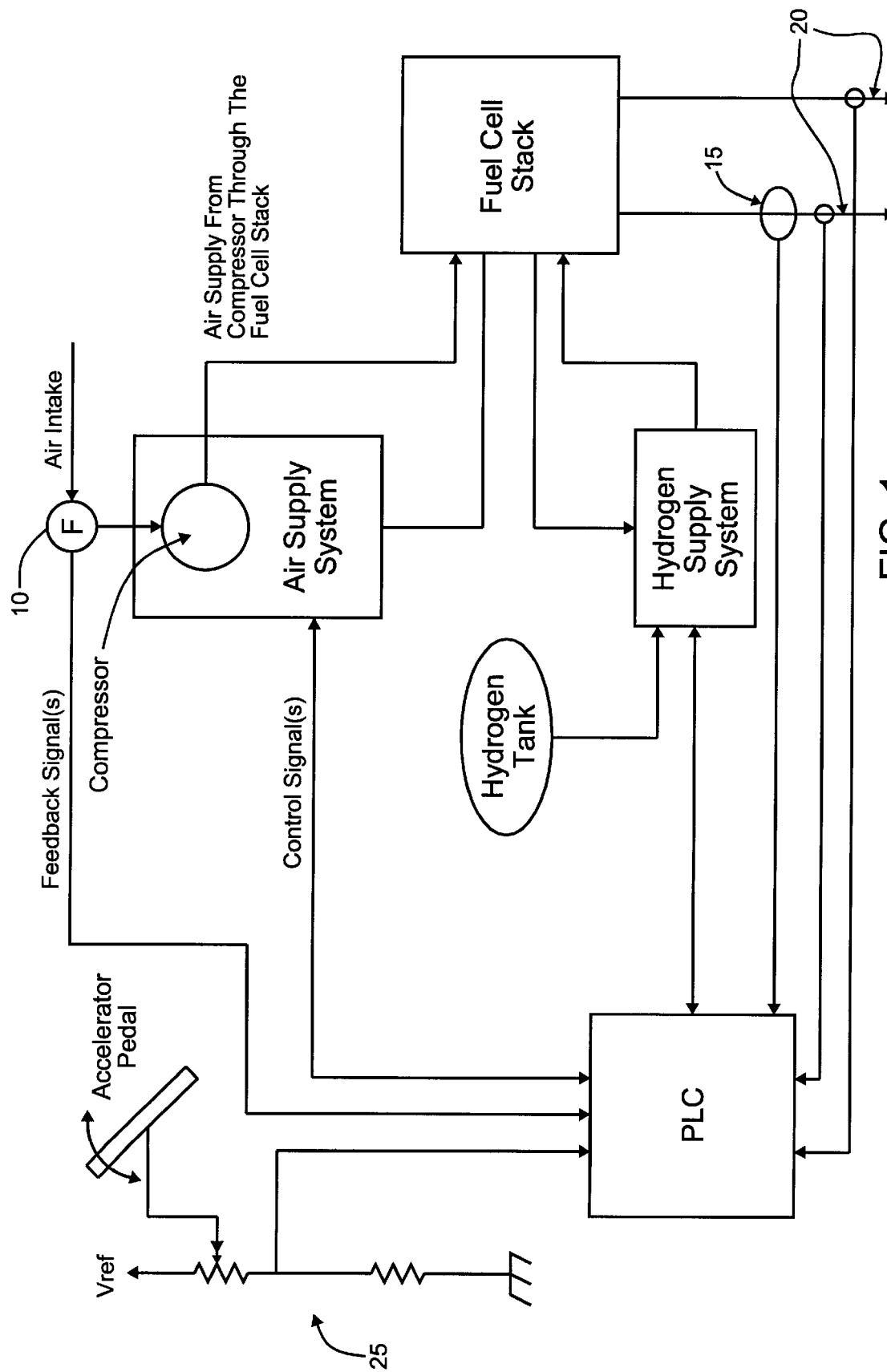
FIG. 1 is a schematic block diagram of one embodiment of a hydrogen and oxygen supply for a fuel cell stack in accordance with the teachings of the prior art.
Figure 2:
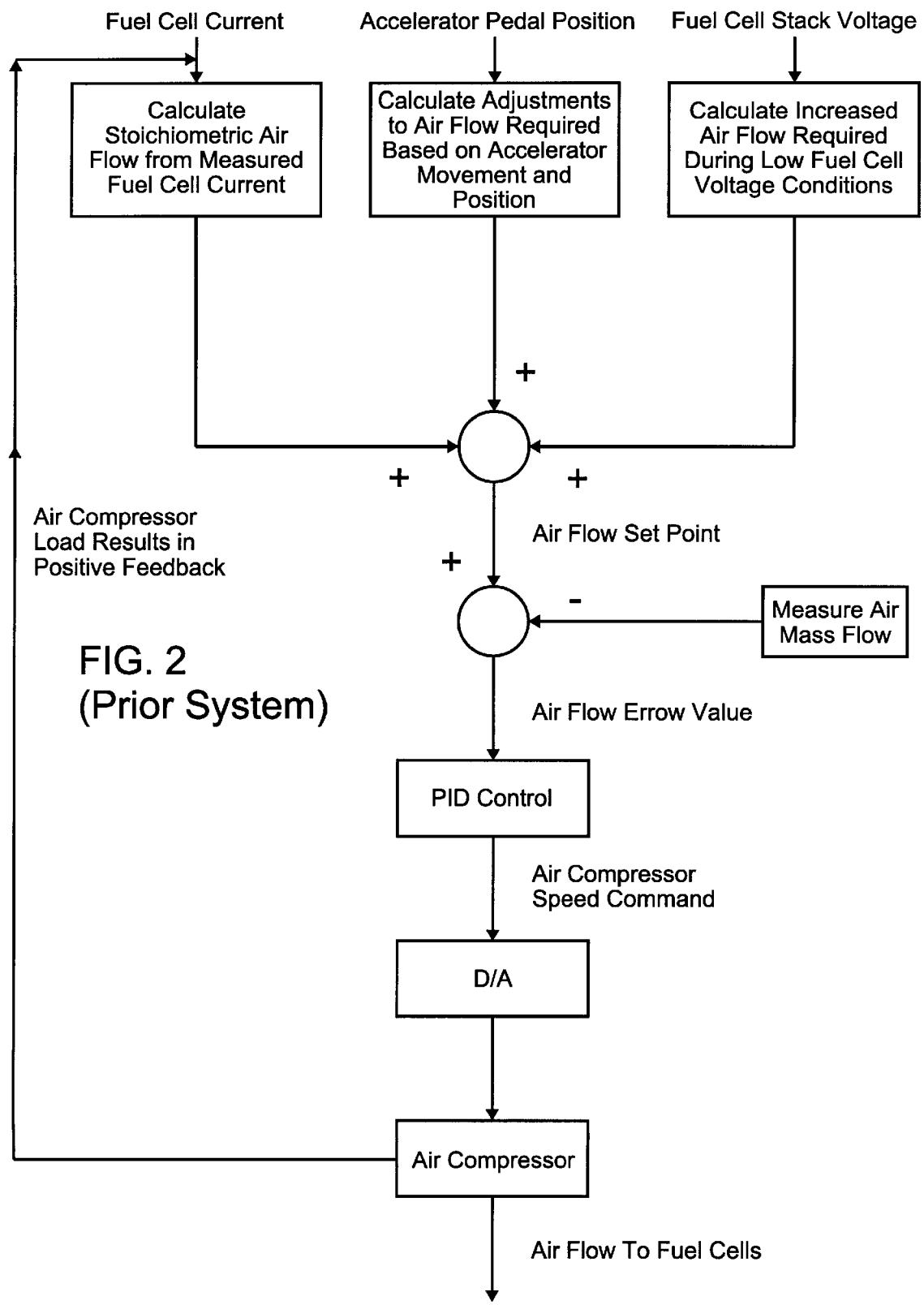
FIG. 2 is a system flow diagram illustrating operation of the system embodiment of FIG. 1.

FIGS. 3A.1, 3A.2, 3A.3 and 3B illustrate one embodiment of the hardware that may be used to implement the present invention. As illustrated, the system, shown generally at 40, includes a programmable logic controller 45 that, for example, may be a PLC that is manufactured and available from General Electric Fanuc or an Allen Bradley Model SLC-500. The PLC 45 receives and supplies signals from and to various electrical systems of the vehicle. Such signals may be either analog, digital, or a hybrid of both analog and digital signals. Input signals to the PLC 45 are shown on the left side of the PLC 45 of FIG. 3A.2 while output signals from the PLC are shown on the right side thereof.

The PLC 45 accepts a plurality of digital switch signals that, for example, are actuated by the vehicle operator to request that the PLC 45 perform certain tasks and operations. Switches 50, 55, 60, and 65 provide an interface for the operator to effectively switch the traction drive between forward, neutral, and reverse, and to initiate running of the vehicle, respectively. The operator initiates a demand for turning the vehicle's air conditioning on or off through switch 70. A demand for turning the vehicle's heating system on or off is initiated by the operator through switch 75. Although the illustrated demand signals are actuated by the operator of the vehicle, such demand signals may also be provided under automatic control. For example, the heating and air conditioning demand signals may be provided as digital signals that are activated automatically by a temperature sensing circuit or the like. Similarly, such signals need not be binary, but may be continuous or have a number of discrete states indicative of the level at which the demanded system is to operate. For example, the heating and cooling systems may have high, medium, and low operating levels, each having different power consumption requirements. In such instances, the signals supplied to the PLC 45 would have the same number of states as the operating levels, e.g., three states each for high, medium, and low level heating and/or cooling operation.

The PLC 45 also receives a plurality of analog signal inputs. These signals include the sensed speed of the traction motor as sensed by a traction motor inverter 80, that may be, for example, a Model EI900-W motor inverter that controls, for example, a Model PA44-6W traction motor 83. Both of these components are available from Kaman Electromagnetics Company of Hudson, Mass. The accelerator pedal movement is sensed by the accelerator pedal circuit 25, and the braking effort is sensed, for example, by measuring the pressure with pressure sensor 84 that is applied by the operator to the brake pedal or the fluid pressure that is exerted within the brake air/hydraulic system. Air mass flow to the fuel cell stack is monitored by a mass flow sensor 85.

Figure 3B:
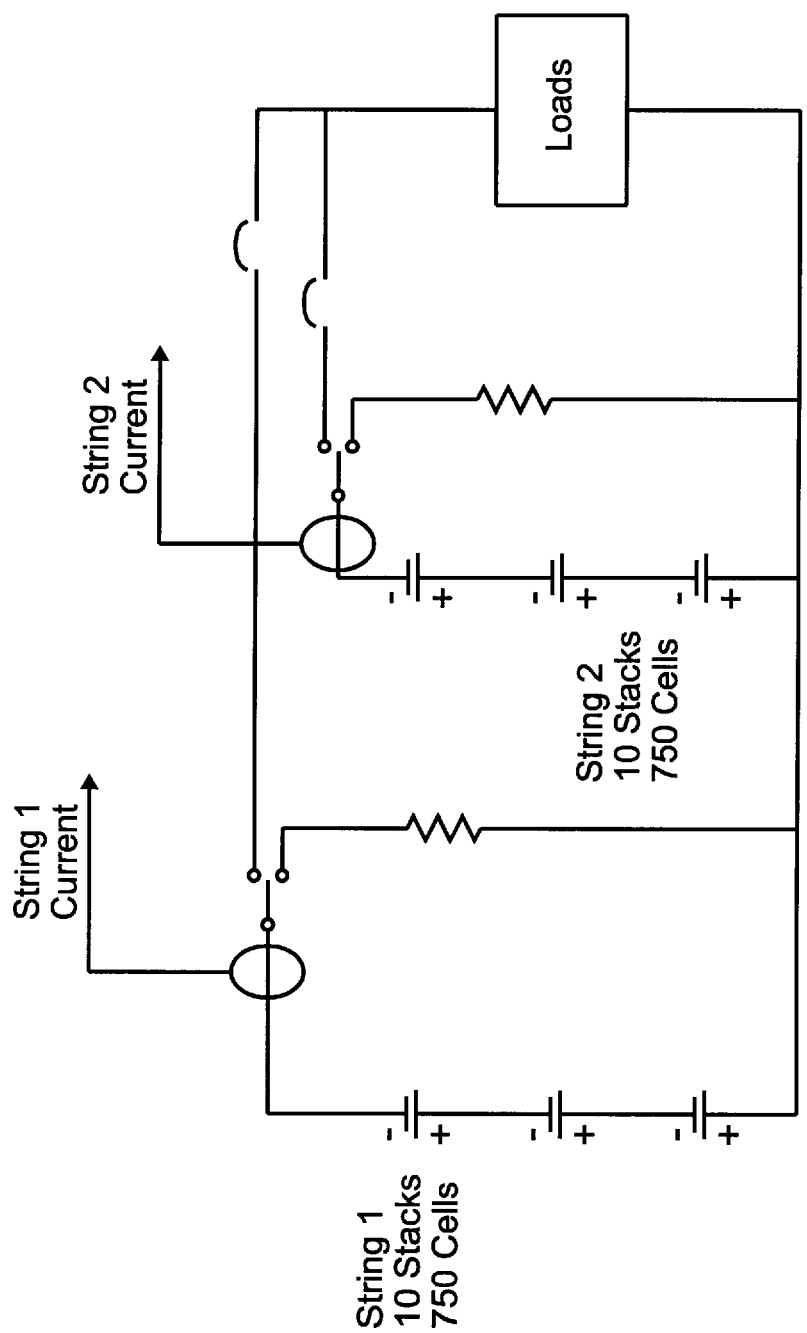
FIGS. 3A.1, 3A.2, 3A.3 and 3B are schematic diagrams of one embodiment of a hardware system in accordance with the teachings of the present invention.

Current drawn from the fuel cell stack is sensed by at least one current sensor. In the illustrated embodiment, two current sensors 90 and 95 are utilized to supply an indication of the fuel cell current to the PLC 45. As shown in FIG. 3B, two current sensors are used because two strings of fuel cell stacks are employed in a parallel configuration. The first and second fuel cell stack strings are selectively connected to the loads through actuation of contactors 91. These sensors may be LT-100 LEM modules available from Leister Blake Enterprises, Ltd., of Vancouver, B.C., Canada. The fuel cell string with the greater sensed current is utilized for operation of the present control system. The fuel cell voltage is sensed by a voltage sensor 100 and the resulting signal is supplied to the PLC 45. The voltage sensor may be an LV-100 LEM module available from Leister Blake Enterprises, Ltd. It is to be noted that the foregoing system illustrated in FIG. 3B is exemplary and need not employ such a parallel configuration.

Fan motors, pumps, and baffles associated with the vehicle's cooling system may also be placed under the control of the PLC 45. One such cooling system is described in U.S. patent application Ser. No. 08/473,248 filed Jun. 7, 1995, entitled "Temperature Regulating System For A Fuel Cell Powered Vehicle", which is incorporated herein by reference in its entirety. Pursuant to such operation, the PLC 45 receives signal inputs from one or more temperature sensors 102 that are strategically placed within the cooling system. These temperature signals operate as demand signals from which the PLC determines that there is a need for additional power and allocates the resources necessary to effect supply of that power from the fuel cell stack and actuate the appropriate fans and motors.

In response to these input signals, the PLC 45 supplies a plurality of output signals that are used to control various systems of the vehicle. Control of the traction motor 83 ensues by providing a torque direction signal 105, a rotation direction signal 110, a traction enable signal 115, and a torque command signal 120 to the traction motor inverter 80 that, in turn, controls the traction motor 83 in response to these received signals. In the illustrated embodiment, signals 105, 110, and 115 are digital signals that are provided to the traction motor inverter (or controller) 80 through a digital isolator 125, while the torque command signal has undergone A/D conversion within the PLC 45 and is provided to the motor inverter 80 as an analog signal.

The PLC 45 responds to the heating and cooling demands of the operator by providing fan control commands to the cabin fan 121 and pump 122 and by adjusting the appropriate valve to allow heated cooling fluid to flow through, for example, coils disposed proximate the blowing cabin fan. In response to an air conditioning demand by the operator, the PLC 45 may actuate the air conditioning compressor at line(s) 123 and the cabin fan. Such activation of the cabin heating and cooling systems may ensue any number of ways, the foregoing being merely illustrative.

The PLC 45 responds to the demand for cooling system control as indicated by temperatures sensors 102 by providing output control signals 103 to at least a main cooling pump and associated radiator fans.

The PLC 45 also plays a primary role in controlling the availability of power from the fuel cell stack and ensuring that power is available to the various electrical systems of the vehicle. To this end, the PLC 45 provides the compressor command output signal 126 that is used to control the air mass flow through the fuel cell stack. In the present system, air mass flow is dependent on the speed of an air compressor 128 that is disposed to urge air through the fuel cell stack (see FIG. 1). As such, the compressor command signal 126 is supplied to the air compressor to control the speed of the compressor. The compressor command signal 126 of the instant embodiment is provided as an analog signal, but digital implementation of such a signal is also contemplated. A binary state compressor enable signal 125 may also be provided to enable and disable the compressor. The compressor command signal 126, as well as the other analog signals output from the PLC 45, may be supplied to the respective systems that they control through analog isolators 127.

Figure 4:
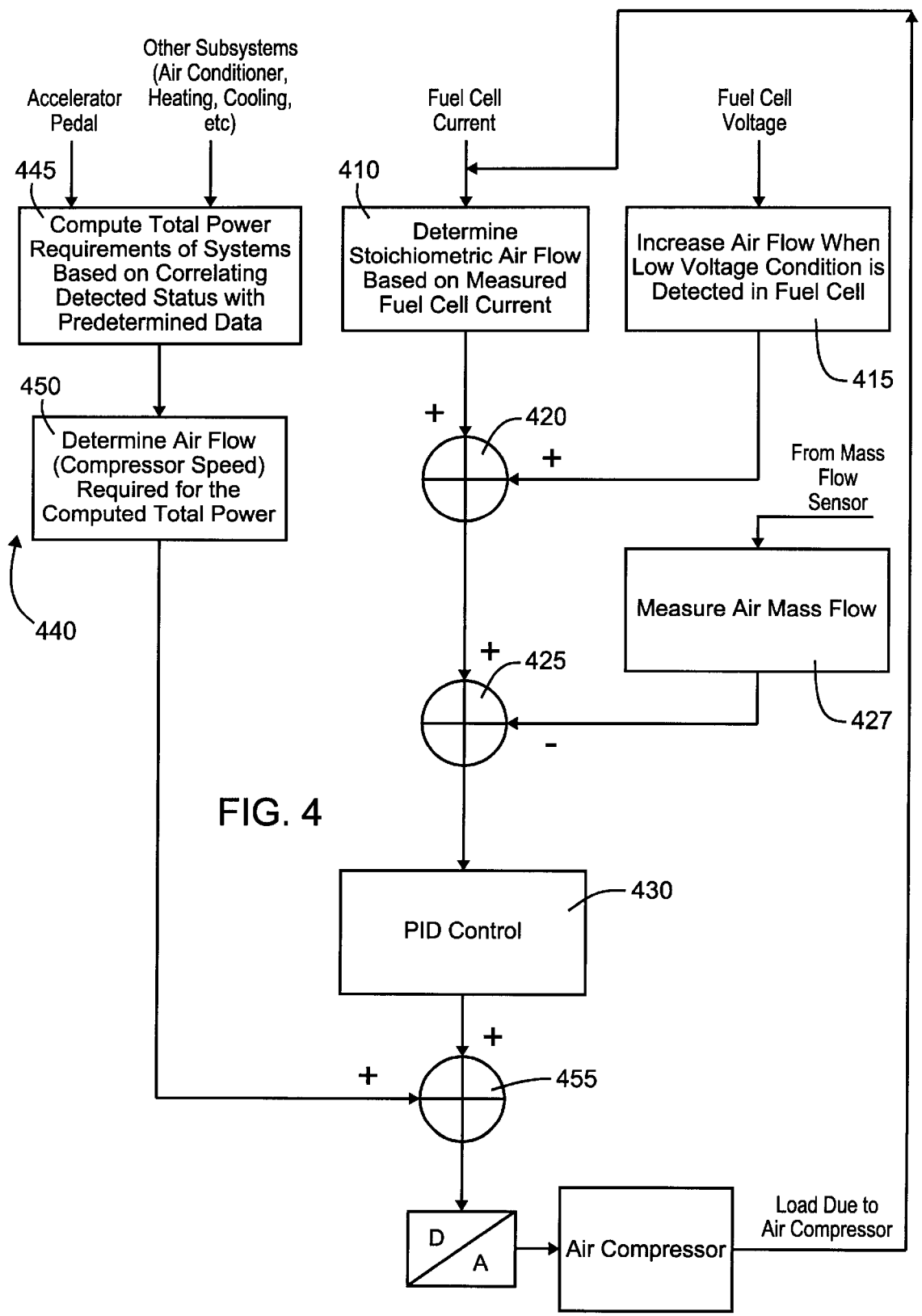
FIG. 4 is a system flow diagram illustrating one manner of operating the system of FIGS. 3A.1, 3B.2, 3B.3 and 3B.

Operation of the foregoing hardware system may be described in connection with FIG. 4. FIG. 4 is a system flow diagram illustrating operation of the PLC 45 and its relationship to various input signals and the air compressor 128. As will be readily understood, the disclosed operational steps may be implemented in software code that is stored, for example, in the memory components of the PLC 45 and by the appertaining hardware circuitry.

As illustrated, a measurement of the actual fuel cell stack current is used at step 410 to determine the stoichiometric air flow that must be supplied to the fuel cell stack to maintain the power output from the fuel cell stack at the measured level. This determination of the stoichiometric air flow can be made by using the fuel cell stack current in a mathematical equation or by employing a look-up table that uses the measured fuel cell stack current value to look-up the value of the stoichiometric air flow. Such methods of determining an output value from a sensed input value are common and, as will be clear from the following discussion, may be used in connection with many of the various determinations and calculations used in the present system. Additionally, the fuel cell stack voltage is measured at step 415 and compared to a minimum threshold value, below which the system determines that an additional increase in air mass flow is required, or that power provided in response to demands from various system loads is to be reduced. The calculated stoichiometric air flow and any increase necessitated by a low voltage condition are combined, for example, summed, by a summer at step 420. The resulting signal is compared at step 425 with the actual air mass flow measured at step 427 by mass flow sensor 85 to generate an error signal that, in turn, is supplied, for example, to a PID control 430.

The PID control 430 provides an output value that represents the required air mass flow from which the compressor speed is adjusted. If the compressor speed were to be adjusted based only on this value, the compressor speed would tend to be difficult to control due to the loading effect that the compressor has upon the measured fuel cell stack current provided to the system at step 410. To counteract this loading effect, a feed-forward system, shown generally at 440 is utilized. The feed forward system 440 accepts position information from the accelerator pedal and, further, receives signals indicative of the status of other electrical power consuming systems of the vehicle at step 445. The total power demand of these systems is then calculated at step 445 using the sensed signals. Pedal position is used to determine whether the vehicle operator is instructing the vehicle to accelerate, decelerate, or remain at the current vehicle speed. The pedal position and its movement over time are used to determine how much power the traction motor will need to respond to the vehicle operator's instruction. Temperature sensor signals indicate whether power to the cooling system is required. The status signals may be simple binary state signals (on/off) indicating that a particular power consuming system is either on or off. Alternatively, these signals may be multiple bit signals or analog signals which indicate the power consuming state of the particular system. The power consuming systems may include, for example, the air conditioning system, the fuel cell stack cooling system, etc. The power demanded by each system is calculated based on the detected status of the respective system. This calculation can be made by employing the detected status information in a predetermined mathematical equation or by using the status information as a look-up indicator in a look-up table. In each instance, the correlation between the status information and the calculated power draw is based on a predetermined correlation that has been, for example, determined empirically.

The total net power requirements determined at step 445 are then used at step 450 to calculate the required air flow. The resulting calculation is combined at step 455 with the required air mass flow value determined by the PID control 430. In the illustrated embodiment, the values are summed together at step 455. Other combining operations may be utilized as well.

The combined signal resulting from step 455 is used to control the speed of the air compressor 128 by, for example, providing for a digital-to-analog conversion of the signal. Since the signal effectively supplied to the compressor 128 is a combination of a signal resulting from a feedback path (i.e., resulting from an error signal based on the fed back measured air mass flow) as well as a signal resulting from the feed forward path 440, the compressor will remain generally stable without, for example, the revving characteristic of prior systems.

Figure 5:
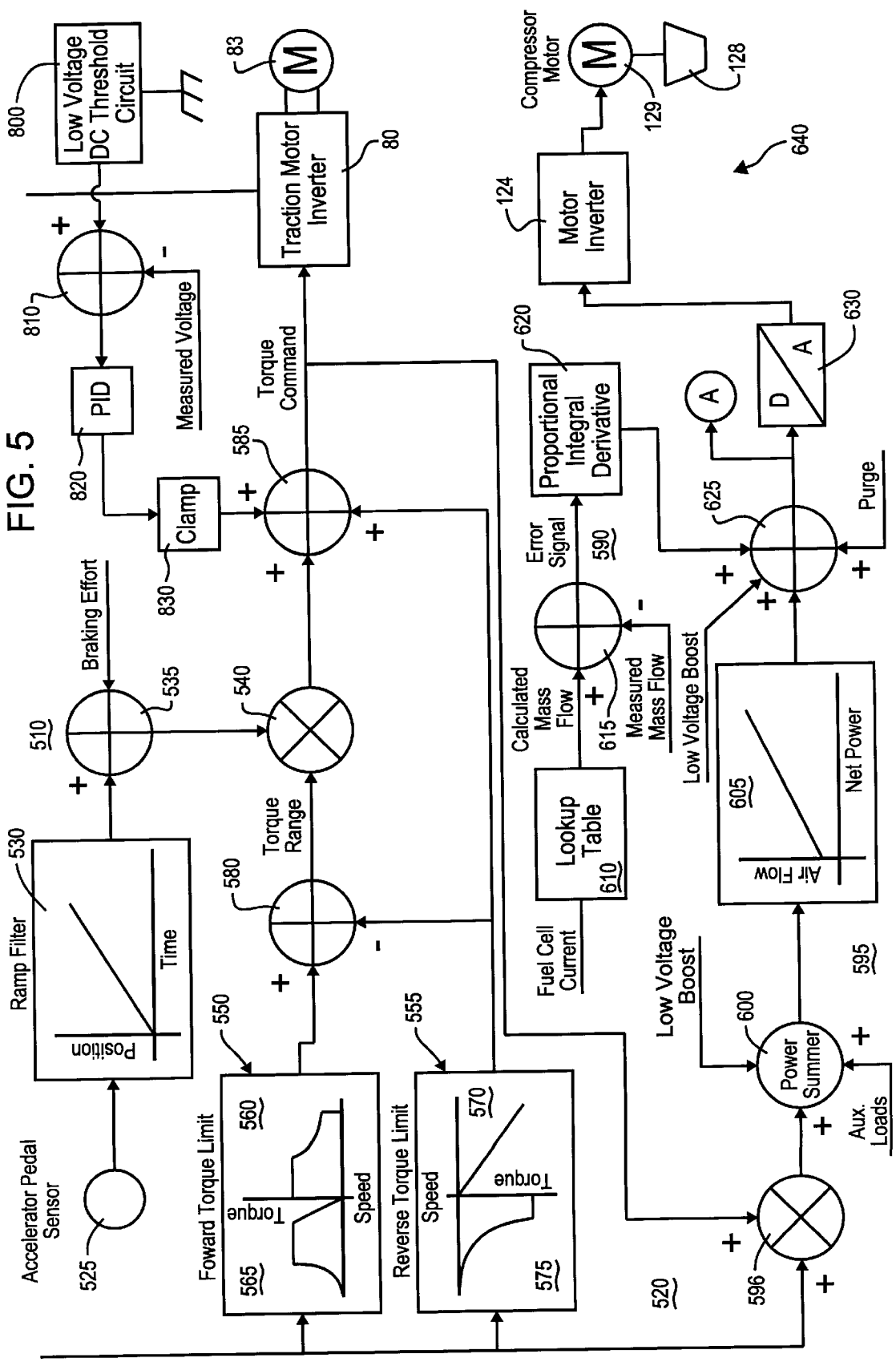
FIG. 5 illustrates a further detailed embodiment of a control system utilizing both feedback and feed-forward control of the compressor.

FIG. 5 illustrates a further detailed embodiment of a control system utilizing both feedback and feed-forward processes to control the speed of the air compressor and, as a result, the air mass flow to the fuel cell stack. Generally stated, the control system of FIG. 5 includes a torque control system 510 and an air control system 520. The torque control system 510 senses the accelerator pedal position at step 525 and provides a digital representation of the position to a ramp filter 530. The output of the ramp filter 530 is added in summer 535 with a digital value representative of the regenerative braking effort applied to the vehicle by the vehicle operator. The regenerative braking effort value represents the braking effort that the vehicle operator is applying to slow or stop the vehicle and can be determined from the pressure applied to the brake in the vehicle cabin, the pressure of the brake fluid in the hydraulic system, etc. The resulting sum is supplied as one operand of multiplier 540.

Multiplier 540 also receives a digital torque range value as another operand. The digital torque range value limits the upper torque command values that are applied to the traction motor controller 80 for use in controlling the traction motor. The limit is determined from the sensed speed of the traction motor which is fed back to a forward torque limit table 550 and a reverse torque limit table 555. The speed value is used as an operand in the limit tables to determine the torque range limits based on whether the torque value is in a direction to drive the vehicle in a forward direction (forward torque limit table 550) or in a reverse direction (reverse torque limit table).

The forward torque limit table includes a quadrant 560 wherein the torque and speed are positive and quadrant 565 wherein the torque limit is positive and the speed is negative. Quadrant 560 is operative when the vehicle is accelerating or at a constant speed while proceeding in the forward direction. Quadrant 565 is operative when the vehicle is proceeding in the reverse direction but is slowing down in that direction.

The reverse torque limit table includes a quadrant 570 wherein the speed is positive and the torque is negative and a quadrant 575 wherein the speed and torque are negative. Quadrant 575 is operative when the vehicle is accelerating or at a constant speed while proceeding in the reverse direction. Quadrant 570 is operative when the vehicle is proceeding in the forward direction but is slowing down in that direction.

For a given speed value, the forward torque value limit and reverse torque value limit are summed in a summer 580 to generate the torque range value. As previously noted, the torque range value is supplied as an operand to multiplier 540 where it is multiplied by the value output from summer 535. The effect of the multiplication is to select where the torque command value is to be within the range of torque values. The resulting value is supplied to a summer 585 where it is added to the value of the reverse torque limit. The output of summer 585 is the torque command value that sets the torque of the traction motor that is to be applied by the traction motor controller 542.

The air control system 520 includes a feedback portion, generally designated at 590, and a feed-forward portion, generally designated at 595. The feed-forward portion 595 accepts the speed value from the traction motor controller 542 and multiples that value by the torque command value in a multiplier 596. The resulting signal represents the power required by the traction motor 83. The traction power value is then added to the power required by other power consuming systems of the vehicle in a power summer 600. The output of power summer 600 has a value representing the total net power demand that is placed on the fuel cell stack. The net power value is used in a look-up table 605 to determine the air mass flow required by the fuel cell stack to meet the power demand. As is readily apparent, the net power value can also be supplied as an input to a mathematical equation to calculate the requisite air mass flow. As noted above, the air mass flow value output from the feed-forward portion 595 is based on the calculated net power required by the system which, in turn, is based on the sensed status of those systems.

The feedback portion 590 accepts the fuel cell stack current value and calculates the air mass flow required by the fuel cell stack using a look-up table 610. The calculated air mass flow is then supplied to the input of a summer 615 where it is compared with, in the illustrated example, subtracted from, the measured air mass flow value that is sensed by mass flow sensor 85. The output of the summer 615 is an error signal value that is applied to the input of a PID control 620. The output of the PID control 620 is added to the calculated output of look-up table 605 by summer 625 to generate an air control command value that is supplied to the input of a digital-to-analog (D/A) converter 630 which converts the air control command value to an analog signal that drives the compressor motor and appertaining circuitry 640124124 at the speed necessary to provide the fuel cell stack with the proper air mass flow.

It may be desirable to provide the foregoing system with some manner of compensating for a fuel cell undervoltage condition. To this end a comparison may be made in a software or hardware comparator between the sensed fuel cell voltage and a first low voltage threshold value. If the measured value of the fuel cell voltage falls below the first threshold value, the comparator output may be used to increase the air mass flow/compressor speed. To this end, such a bias may be applied to either the feed-forward or feedback paths which increases the resulting compressor speed upon the detection of the low voltage output condition of the comparator. For example, such a bias may be supplied to the input of the power summer 600 or as an input that is combined with the PID 620 output and feed-forward path output at 625.

A low voltage condition may also be compensated by reducing the load on the fuel cell. For example, the PLC may refuse to activate selected power consuming systems despite having received a demand signal requesting that such systems be activated. Additionally, the torque command applied to the traction motor inverter 80 may be reduced by an amount sufficient to ensure that the fuel cell voltage does not proceed to an inoperable level. To this end, a second low voltage threshold is generated at component 800 and supplied to summer 810 where it is compared to the measured fuel cell voltage. The output of summer 810 is supplied to a PID control 820 which generates a torque bias signal to a clamp 830. Clamp 830 ensures that the upper limit of the PID output is less than or equal to zero. The clamped signal is then applied to summer 585 to reduce the torque of the traction motor and, thus, the overall load on the fuel cell. Preferably, the second low voltage threshold value is less than the first low voltage threshold value.

Figure 6:
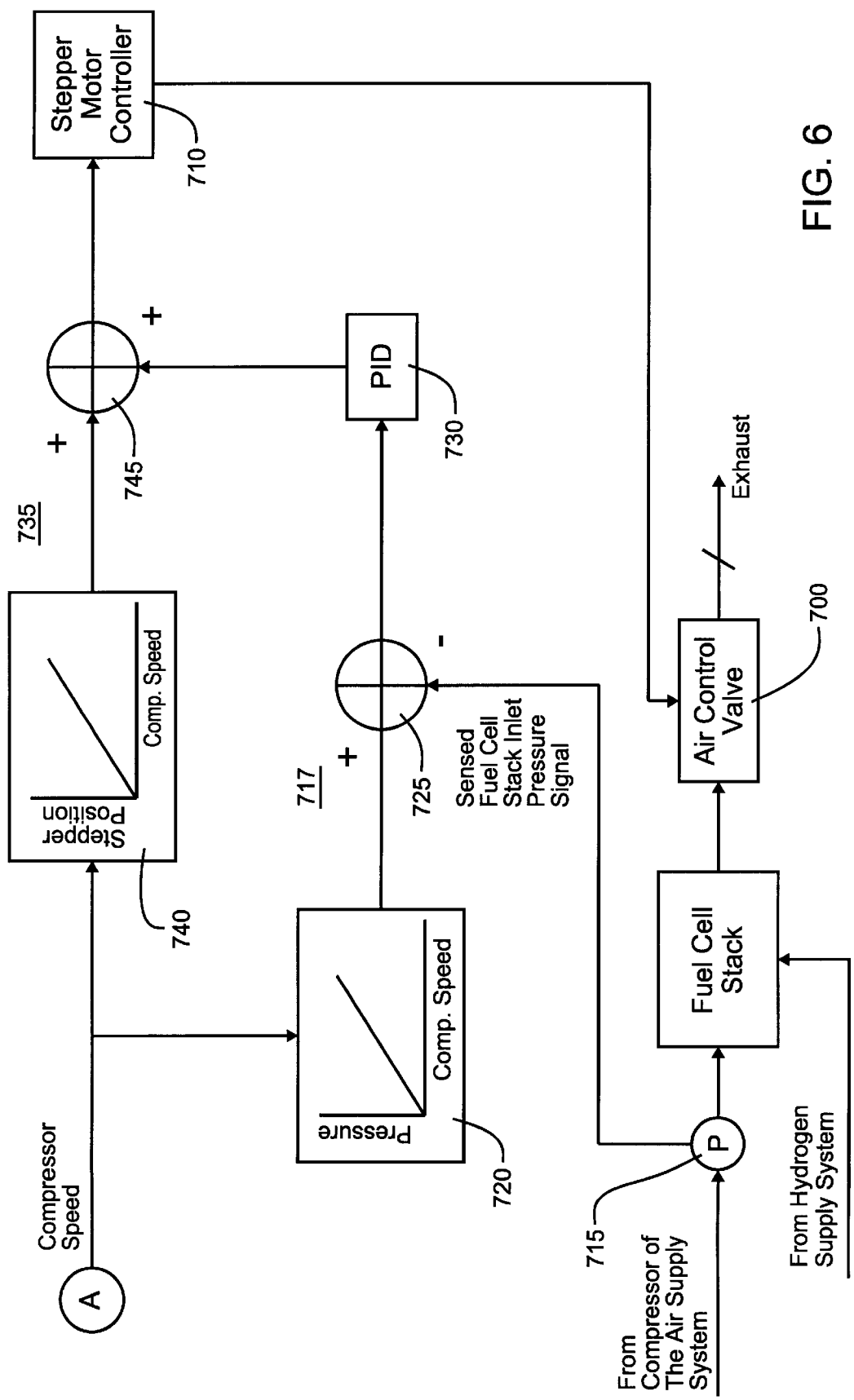
FIG. 6 illustrates an additional enhancement to the foregoing system to control the reaction in the fuel cell stack.

FIG. 6 illustrates an additional enhancement to the foregoing system to control the reaction in the fuel cell. This system can be used either alone or in conjunction with the previously described system and enables use of a lower PID (730) gain while retaining both a short response time and system stability.

The system enhancement of FIG. 6 is designed to regulate the air pressure within the fuel cells based on the air mass flow to thereby optimize the fuel cell system performance. As shown, a motorized valve 700 that is controlled by a stepper motor controller 710 is disposed at the air exhaust of the fuel cells. A pressure sensor 715 is also disposed to measure the pressure of the air at the inlet to the fuel cells.

Air mass flow, as noted above, is dependent on the speed of the compressor in the illustrated embodiment. Therefore, the compressor speed command calculated by the PLC 45 is used as an input to the present system to control the stepper motor controller 710 which, in turn, controls the degree to which the motorized valve 700 is opened or closed. Other means for determining the compressor speed/mass flow may be utilized as well.

The compressor speed is provided to the input of a feedback path 717 where it is used, for example, by a look-up table 720 to select the pressure for the given air mass flow/compressor speed. The selected pressure is then compared at 725 with the actual pressure as sensed by pressure sensor 715 to generate an error signal that, in turn, is supplied to PID 730 for processing. The output of the PID 730 represents the correction to the position of the stepper motor required to obtain the desired pressure at the fuel cell inlet.

The output of the PID 730 is combined with the output of a feed-forward path 735. The feed-forward path accepts the compressor speed/air mass flow value and uses the value, for example, in look-up table 740 where it is used as an operand to calculate the required stepper motor position. This calculation is based on empirically determined values and does not involve a comparison with the sensed pressure value. The resulting value is combined with the correction value from the PID in summer 745. The combined value is provided to the stepper motor controller 710 to control the motorized valve.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. In a fuel cell system for a motor vehicle having electric powered systems, said fuel cell system having a compressor for supplying a gas for reaction within a fuel cell stack, said fuel cell system further comprising a control system that includes a feedback signal path that provides a signal for use in controlling compressor speed based on at least one sensed fuel cell output power signal component, the control system further comprising:

(a) power summing means for determining the total amount of power demanded by said electric powered systems of said motor vehicle based on a plurality of sensed power demand signals and generating an output signal indicative of the compressor speed needed to meet the demanded power needs; and (b) combining means for combining said signal output of said feedback signal path with said output of said power summing means to generate a compressor speed signal for control of said compressor.

2. In a fuel cell system for a motor vehicle having electric powered systems, said fuel cell system having a compressor for supplying a gas for reaction within a fuel cell stack, a control system comprising:

(a) power monitoring means for monitoring at least one signal component indicative of fuel cell power drawn by said electric powered systems of said motor vehicle;

(b) gas flow calculating means for calculating a required gas flow to said fuel cell stack to provide power to said electric powered systems as measured by said power monitoring means;

(c) gas flow monitoring means for monitoring gas flow to said fuel cell stack and comparing said monitored gas flow with said required gas flow to generate an error signal;

(d) feed forward monitoring means for determining power demand status of said electric powered systems of said motor vehicle based on plurality of demand signals;

(e) feed forward calculating means for calculating total power demanded by said motor vehicle based on correlating said demand signals monitored by said feed forward monitoring means with predetermined data for each of said electric powered systems, said predetermined data corresponding to power drawn by each of said electric powered systems in the state of said demand signals monitored by said feed forward monitoring means, said feed forward calculating means providing an output signal indicative of a calculated required gas flow to said fuel cell stack;

(f) combining means for combining said error signal with said output signal of said feed forward calculating means to generate a gas flow signal for control of said compressor.

3. In a fuel cell powered vehicle wherein fuel cell stack power output is dependent upon a flow of a reactant gas through a fuel cell stack, said flow of reactant gas being determined by compressor speed, a system comprising:

(a) means responsive to a measured fuel cell stack current value for providing a reactant gas mass flow signal output signal indicative of a reactant gas mass flow level required to maintain power output by said fuel cell stack at said measured fuel cell stack current value;

(b) feedback means for measuring actual reactant gas mass flow through said fuel cell stack and comparing said actual reactant gas mass flow to said reactant gas mass flow signal output to generate a correction signal;

(c) feed forward means for measuring power demands by said fuel cell powered vehicle based on status indicative of power demanded by a plurality of power consuming systems of said vehicle and generating a calculated reactant gas mass flow signal based on said measured power demands; and (d) combining means for combining said correction signal with said calculated reactant gas mass flow signal to generate a control signal for controlling said speed of said compressor.

4. A control system for controlling the speed of a compressor to control mass flow of a reactant gas through a fuel cell stack of a fuel cell powered vehicle having electric power consuming systems, said control system comprising:

(a) first summing means for summing measured traction power and measured demand for auxiliary load power to generate a net power demand signal;

(b) first reactant gas mass flow determining means for generating a first reactant gas mass flow signal in response to said net power demand signal;

(c) fuel cell current measuring means for measuring fuel cell stack current through said fuel cell;

(d) second reactant gas mass flow determining means for generating a second reactant gas mass flow signal in response to said measured fuel cell stack current;

(e) actual reactant gas mass flow measuring means for measuring an actual reactant gas mass flow;

(f) comparing means for comparing said actual reactant gas mass flow to said second reactant gas flow signal to generate an error signal;

(g) PID signal generating means for generating a proportional-integral-derivative signal from said error signal means; and (h) second summing means for summing said proportional-integral-derivative signal with said first reactant gas mass flow signal to generate a compressor speed signal for controlling said speed of said compressor.

* * * * *

UNITED STATES PATENT AND TRADEMARK OFFICE
CERTIFICATE OF CORRECTION

PATENT NO. : 5,771,476
DATED : June 23, 1998
INVENTOR(S) : Mufford, et al

It is certified that error appears in the above-identified patent and that said Letters Patent is hereby corrected as shown below:

Col. 3, line 7, delete "3B.2, 3B.3" and substitute therefor --3A.2, 3A.3--.

Signed and Sealed this

Eighth Day of September, 1998

Attest:

BRUCE LEHMAN

Attesting Officer

Commissioner of Patents and Trademarks